(12) United States Patent
Nakato et al.

(10) Patent No.: US 7,201,338 B2
(45) Date of Patent: Apr. 10, 2007

(54) FROZEN BEVERAGE BLENDER

(75) Inventors: Yutaka Nakato, Mie (JP); Kaoru Suzuki, Mie (JP); Noriyuki Kobayashi, Mie (JP)

(73) Assignee: Joytec Corporation, Mie (JP)

( * ) Notice: Subject to any disclaimer, the term of this patent is extended or adjusted under 35 U.S.C. 154(b) by 0 days.

(21) Appl. No.: 10/514,458

(22) PCT Filed: May 14, 2003

(86) PCT No.: PCT/JP03/05964

§ 371 (c)(1),
(2), (4) Date: Jan. 30, 2006

(87) PCT Pub. No.: WO03/095910

PCT Pub. Date: Nov. 20, 2003

(65) Prior Publication Data

US 2006/0243838 A1    Nov. 2, 2006

(30) Foreign Application Priority Data

May 14, 2002   (JP)   ............................. 2002-139171

(51) Int. Cl.
  *B02C 17/02*    (2006.01)
  *B07B 13/00*    (2006.01)
(52) U.S. Cl. .................. 241/92; 241/DIG. 17; 241/100
(58) Field of Classification Search ........ 241/DIG. 17, 241/92, 100, 84, 98; 99/509–511
See application file for complete search history.

(56) References Cited

U.S. PATENT DOCUMENTS

| | | | | |
|---|---|---|---|---|
| 2,138,716 A | * | 11/1938 | Truitt | ...................... 241/273.2 |
| 3,051,401 A | * | 8/1962 | Huck | ....................... 241/278.1 |
| 3,171,605 A | * | 3/1965 | Huck et al. | .............. 241/278.1 |
| 3,552,663 A | * | 1/1971 | Royals | ......................... 241/92 |
| 4,055,099 A | * | 10/1977 | Mitsubayashi | ............... 83/403 |
| 4,095,751 A | * | 6/1978 | Artin | ......................... 241/37.5 |
| 4,786,002 A | * | 11/1988 | Mitsubayashi et al. | .. 241/101.8 |
| 6,216,968 B1 | * | 4/2001 | Karkos, Jr. | .............. 241/101.2 |

OTHER PUBLICATIONS

International Search Report dated Aug. 19, 2003.

* cited by examiner

*Primary Examiner*—Bena Miller
(74) *Attorney, Agent, or Firm*—Reed Smith LLP; Stanley P. Fisher, Esq.; Juan Carlos A. Marquez, Esq.

(57) ABSTRACT

A frozen beverage blender equipped with an ice cutting mechanism including an upright machine frame mounted on a base structure, an upper hood horizontally mounted on the upper portion of the machine frame to be detachable downwardly, the upper hood having a downwardly inclined conical inner surface, a cutting disk coupled at its lower end outer periphery with a lower end outer periphery of the upper hood to be detachable downwardly, the cutting disk having a conical upper surface downwardly inclined from its center and being provided with a cutting blade mounted thereon in such a manner that the edge of the cutting blade is positioned upward at a radial slit formed in the cutting disk, a rotary shaft vertically extending through the center of the upper hood and being supported at its lower end on the head of the cutting disk, and a rotary plate driven by the rotary shaft to rotate along the upper surface of the cutting disk, wherein the upper hood has a cylindrical head portion formed with an inlet opening for introducing ice cubes falling from an ice storage container located above the machine frame.

12 Claims, 3 Drawing Sheets

FROZEN BEVERAGE BLENDER

BACKGROUND OF THE INVENTION

1. Field of the Invention

The present invention relates to a frozen beverage blender equipped with a cutting mechanism of ice cubes.

2. Description of the Prior Art

As is disclose in Japanese Utility Model Registration No. 252637, a cutting mechanism of this kind adapted for use in a frozen beverage blender is composed of an ice storage container placed above a conical casing, a cutting blade mounted on an upwardly inclined peripheral wall of the conical casing, a rotary plate driven by rotation of a rotary shaft to rotate along the inner surface of the conical casing, and a chute arranged at a front side of a beverage blender to introduce ice cubes falling from the ice storage container and drop ice pieces sliced by the cutting blade just under the cutting blade.

In the cutting mechanism described above, a large amount of ice cubes dropped in the conical casing are moved upward along the inner wall of the conical casing under a centrifugal force of the rotary plate driven by rotation of the rotary shaft and thrusted toward an annular plate arranged above an outer periphery of the rotary plate so that the ice cubes are sliced by the cutting blade under a reaction force applied thereto. In such operation of the cutting mechanism, cutting noises of the ice cubes become large. The ice cubes falling on the axis center of the rotary plate causes the ice cubes in the container to rotate with the rotary plate, resulting in further increase of the cutting noises of ice cubes. In the case that the conical casing is formed small in size to decrease the cutting noises of ice cubes, an amount of ice cubes sliced by the cutting blade per unit time is reduced, resulting an increase of cutting time of the ice cubes.

In use of the frozen beverage blender of this kind, it is required to wash the parts such as the cutting blade placed in contact with ice cubes in operation. In the ice cutting mechanism, an electric motor is, however, placed under the conical casing for driving the rotary wing. Accordingly, all the parts have to be removed from the upper portion of the cutting mechanism for washing, resulting in a trouble in washing of the parts.

SUMMARY OF THE INVENTION

To solve the problems described above, a primary object of the present invention is to provide a frozen beverage blender equipped with an ice cutting mechanism capable of cutting ice cubes in a short period of time and decreasing the cutting noises of ice cubes in operation.

According to the present invention, the object is accomplished by providing a frozen beverage blender equipped with an ice cutting mechanism including an upright machine frame mounted on a base structure, an upper hood horizontally mounted on the upper portion of the machine frame to be detachable downwardly, the upper hood having a downwardly inclined conical inner surface, a cutting disk coupled at its lower end outer periphery with a lower end outer periphery of the upper hood to be detachable downwardly, the cutting disk having a conical upper surface downwardly inclined from its center and being provided with a cutting blade mounted thereon in such a manner that the edge of the cutting blade is positioned upward at a radial slit formed in the cutting disk, a rotary shaft vertically extending through the center of the upper hood and being supported at its lower end on the central head of the cutting disk, and a rotary plate driven by the rotary shaft to rotate along the upper surface of the cutting disk, wherein the upper hood has a cylindrical head portion formed with an inlet opening for introducing ice cubes falling from an ice storage container located above the machine frame, and wherein a cylindrical lower hood is integrally assembled at its upper end with the lower end outer periphery of the upper hood through the lower end outer periphery of the cutting disk, and a beverage container put on the base structure to store an amount of beverage is detachably engaged at its upper end opening with the lower end outer periphery of the lower hood to receive ice pieces sliced by and dropping from the cutting blade.

In the frozen beverage blender described above, the ice cubes falling from the chute are introduced into a space between the downwardly inclined conical inner surface of the upper hood and the downwardly inclined conical upper surface of the cutting disk and thrusted toward the cutting blade under the component of a centrifugal force caused by rotation of the rotary shaft. Thus, the ice cubes are sliced by the cutting blade positioned in the radial direction across the axis of the rotary shaft. This is effective to decrease cutting noises of the ice cubes in operation and to slice the ice cubes in a short period of time. With arrangement of a plurality of cutting blades about the rotary shaft, the cutting mechanism can be constructed small in size, and the ice cubes can be sliced in a more shorter period of time. In the case that the chute is inserted into the inlet opening formed in the cylindrical head portion of the upper hood to introduce the ice cubes falling from the ice storage container toward the rotary shaft, the ice cubes in the ice storage container can be prevented from rotation with the rotary shaft to further decrease cutting noises of the ice cubes in operation.

As in the frozen beverage blender, the cutting disk and lower hood are mounted to the lower end outer periphery of the upper hood by means of common screws, the cutting blade assembled with the cutting disk and the rotary plate can be removed downward in a simple manner for washing. In a practical embodiment of the present invention, it is preferable that the angle of the conical upper surface of the cutting disk relative to the conical inner surface of the upper hood is determined taking into account of the size of ice cubes stored in the ice storage container. Such arrangement of the angle is effective to increase the component of a centrifugal force acting on the ice cubes caused by rotation of the rotary shaft thereby to rapidly slice the ice cubes.

DESCRIPTION OF THE PREFERRED EMBODIMENT

Figure 1:
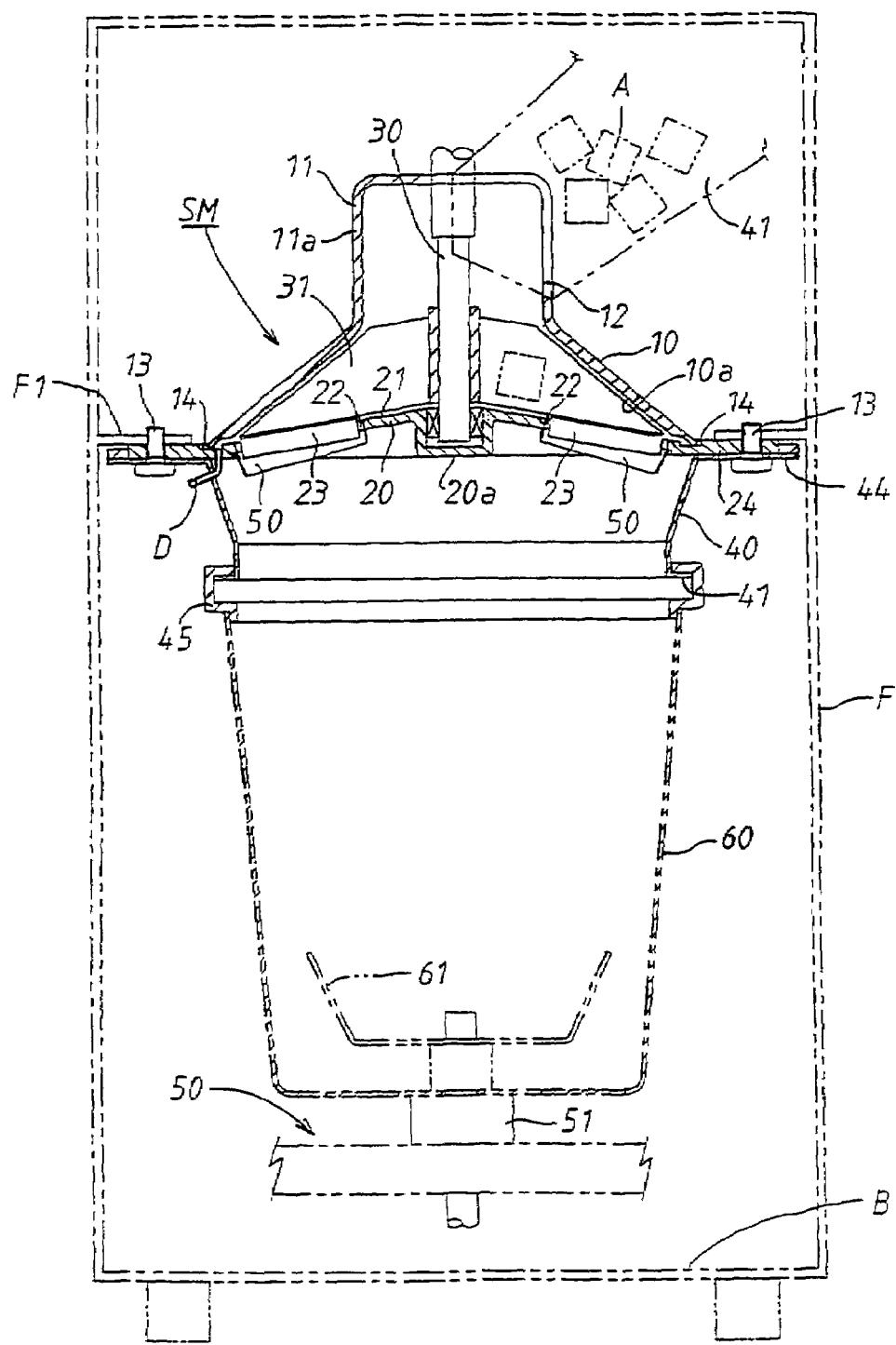
FIG. 1 is a sectional view of an embodiment of a frozen beverage blender equipped with an ice cutting mechanism in accordance with the present invention.
Figure 2:
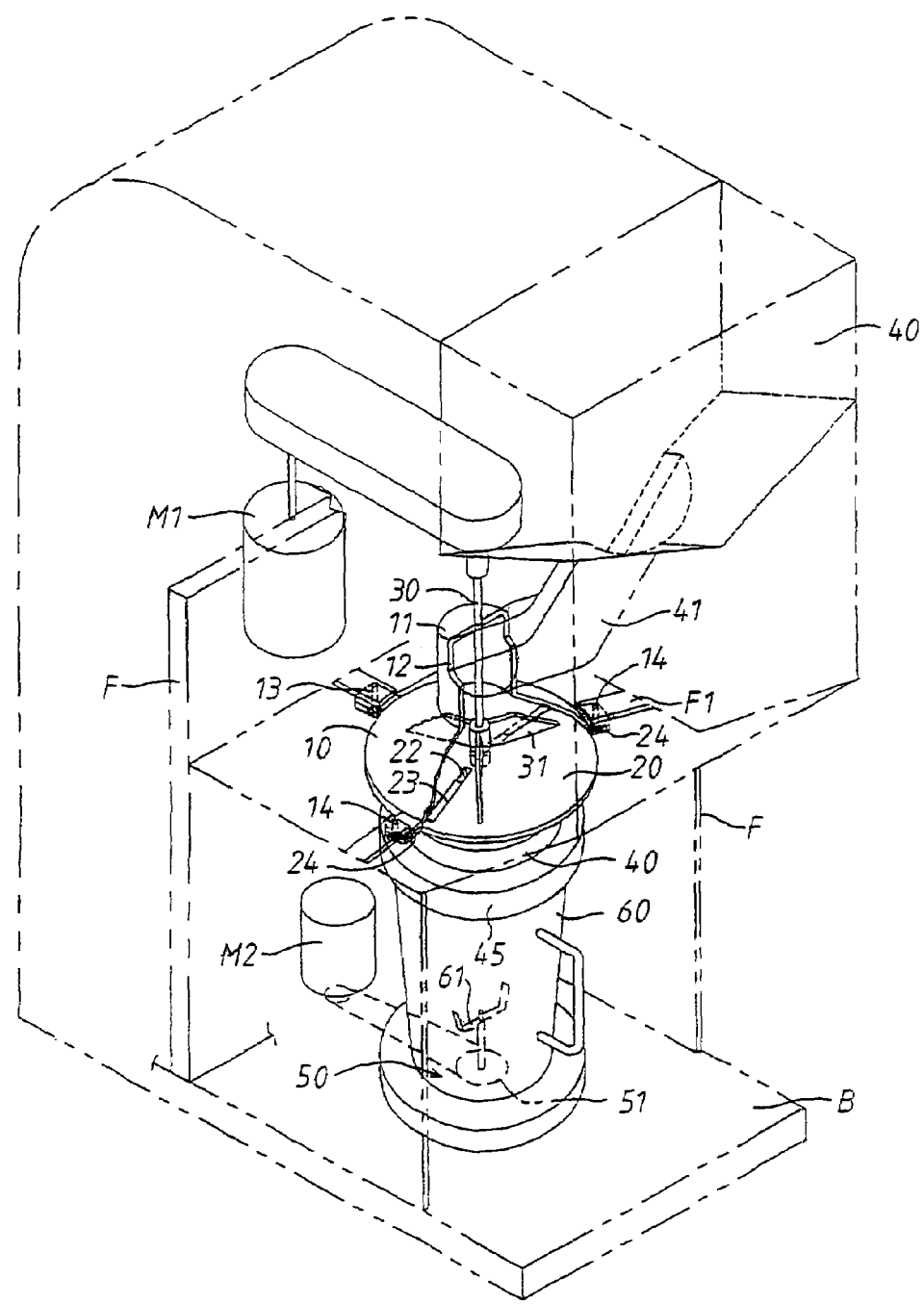
FIG. 2 is a perspective view of the frozen beverage blender shown in FIG. 1.
Figure 3:
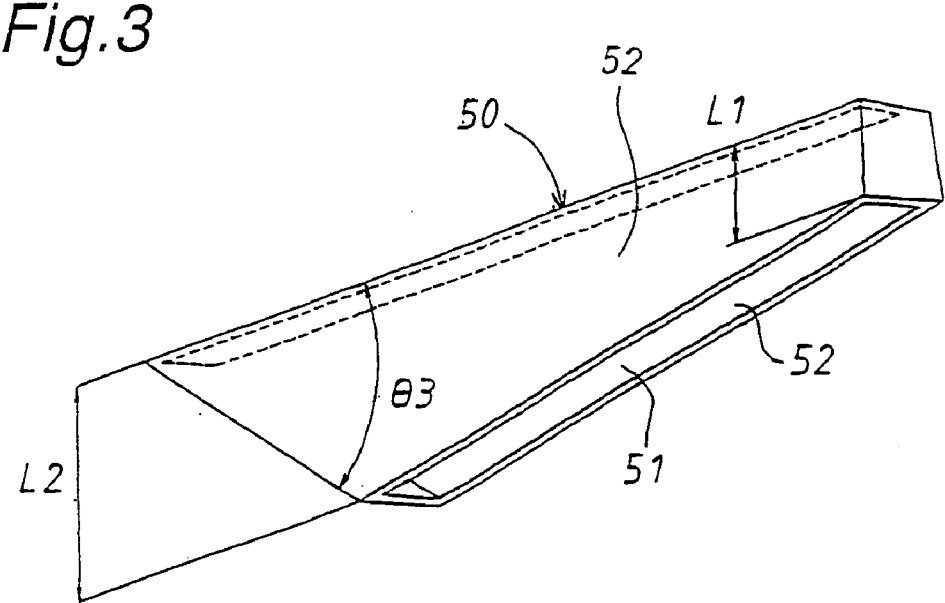
FIG. 3 is a perspective view of a rectifier mounted to the bottom of a cutting disk in the ice cutting mechanism shown in FIGS. 1 and 2.

Illustrated in FIGS. 1 and 2 is a preferred embodiment of a frozen beverage blender equipped with an ice cutting mechanism in accordance with the present invention. The ice cutting mechanism in this embodiment includes an upright machine frame F mounted on a base structure B, an upper hood of aluminum die-casting horizontally mounted within the upright frame F to be removable downwardly, a cutting disk 20 of aluminum die-casting coupled at its lower end periphery with the lower end outer periphery of upper hood 10 to be removable downwardly, a rotary shaft 30 extended through the center of upper hood 10 and supported at its lower end on a boss portion formed on the head of cutting disk 20, and rotary plates 31 of aluminum die-casting driven by rotation of the rotary shaft 30 to rotate along the upper surface of cutting disk 20.

Figure 4:
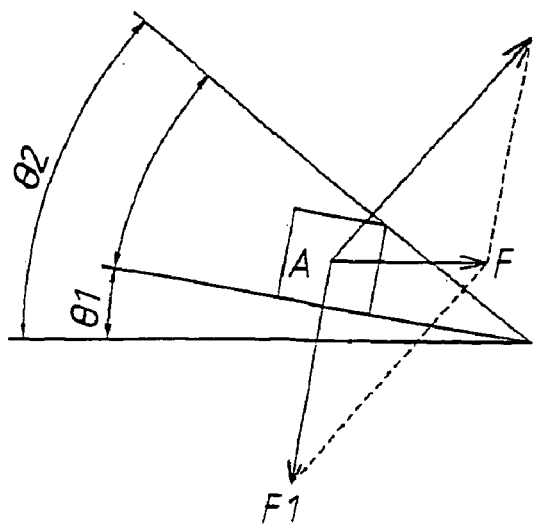
FIG. 4 illustrates a thrust force acting on ice cubes in the ice cutting mechanism.

The upper hood 10 has a downwardly inclined conical inner surface 10a and a cylindrical head portion 11 formed at its peripheral wall 11a with an inlet opening 12 through which a chute 41 is inserted from upward to introduce ice cubes falling from an ice storage container placed above the machine frame F. The cutting disk 20 has a downwardly inclined conical upper surface 21. A pair of cutting blades 23 of stainless steel are mounted on the cutting disk in such manner that the edges of the cutting blades are positioned upward at a pair of radial slits formed in the upper surface 21 of cutting disk 20. In this embodiment, the inclined angle θ1 of the conical upper surface is determined at 10° taking into account of the size of ice cubes supplied from the ice storage container 40, while the inclined angle θ2 of the conical inner surface of upper hood 10 is determined at 50°. (see FIG. 4) Such arrangement of the angles is effective to increase the component of a centrifugal force F acting on the ice cubes A caused by rotation of the rotary plates 31 in cutting operation (or a thrust force acting on the cutting blades 23 of ice cubes).

The rotary plate 31 is composed of three rotary plates circumferentially equally spaced and mounted to the rotary shaft 30 for rotation along the conical upper surface 21 of cutting disk 20 in a condition where the bottoms of rotary plates 31 are spaced in a predetermined gap from the edges of cutting blades 23. In this embodiment, an electric motor M1 is mounted on an upper portion of the machine frame F at one side of the upper hood 10 to drive the rotary shaft 30 by way of a belt-transmission mechanism.

In addition, the cutting disk 20 is formed at its lower end outer periphery with circumferentially spaced flanges 24 which are coupled with circumferentially spaced flanges 14 formed on the lower end outer periphery of upper hood 10. The flanges 24 of cutting disk 20 are fixed to a support member F1 mounted on an upper portion of the inner wall of machine frame F together with circumferentially spaced flanges 44 formed on an upper end outer periphery of a lower hood 40 by means of screws 13.

Mounted to the bottom of cutting disk 20 are rectifiers 50 which are formed respectively with a rectifying opening 51 for introducing ice pieces sliced by the cutting blade 23 toward the central portion of lower hood 40. As shown in FIG. 5, the width and length of a rectifying opening formed between the upper ends of both side walls 52 corresponds with those of each slit 22, and the length of the rectifying opening 51 corresponds with the length of cutting blade 23. The height L1 of the front ends of both side walls 52 is determined lower than that of the rear ends thereof so that the rectifying opening 51 is formed shallow at its front end portion and deep at its rear end portion. Thus, the rear end wall of rectifying opening 51 is inclined at an angle θ3 relative to the bottom of each slit 22. Mounted to the outer periphery of cutting disk 20 is a drain pipe D the distal end of which is extended outward from the lower hood 40.

The lower hood 40 is in the form of a cylindrical member which is made of plastic and provided with an elastic ring 45 of silicon rubber vertically movably coupled with an annular flange 41 formed on the lower end thereof. The elastic ring 45 is coupled with the upper end opening of a beverage container in a liquid tight manner. The beverage container 60 is detachably mounted on a clutch 51 of a mixing mechanism 50 assembled on the base structure B. An agitator 61 detachably coupled with the bottom of beverage container 60 is driven by rotation of a drive shaft when the beverage container 60 has been put on the clutch 51 of the mixing mechanism for engagement therewith. As shown in FIG. 2, the input member of clutch 51 is driven by an electric motor M2 mounted on the base structure B at one side of the beverage container 60. The drive shaft rotated by engagement of the clutch 51 is arranged in coaxial with the rotary shaft 30 of the rotary plates 31.

In use of the frozen beverage blender, an amount of beverage such as condensed juice is poured in the beverage container 60 in accordance with the user's favor in a condition where ice cubes produced in an ice maker have been stored in the ice storage container. The beverage container 60 is put on the clutch 51 on the base structure B for engagement therewith in such a manner that the upper end of container 60 is engaged with the elastic ring 45 and coupled therewith. When a power switch (not shown) is closed in such a condition, the electric motors M1 and M2 are activated to drive the rotary plates 31 and agitator 61. Then, ice cubes falling into the inlet opening 12 of upper hood 10 from the ice storage container 40 through the chute 41 are stirred by rotation of the rotary plates 31, moved by a centrifugal force acting thereon toward the outer periphery of cutting disk 20, and thrusted to the conical inner surface of upper hood 10. Thus, the ice cubes are thrusted by a component of the centrifugal force toward the edges of cutting blades 23 and sliced by the cutting blades 23. The sliced ice pieces are discharged from the slits 22 into the central portion of beverage container 60 through the rectifiers 50. In such an instance, the rectifiers 50 are useful to prevent the sliced ice pieces from flying across the slits 22 and to restrict the discharging direction of sliced ice pieces. On the other hand, the beverage stored in the container 60 is stirred with the sliced ice pieces introduced by the rectifiers 50 during rotation of the agitator 61 and prepared as an amount of desired frozen beverage. In such operation, the elastic ring 45 is useful to prevent the prepared frozen beverage from flowing out of the upper end opening of the container 60.

As is understood from the foregoing, the ice cubes falling from the chute 41 are introduced into a space between the downwardly inclined conical inner surface 10a of upper hood 10 and the downwardly inclined conical upper surface 21 of cutting disk 20 and thrusted toward the cutting blades 23 under the component F1 of a centrifugal force F caused by rotation of rotary shaft 30. Thus, the ice cubes are sliced by the cutting blades 23 positioned in the radial direction across the axis of rotary shaft 30. This is effective to decrease cutting noises of the ice cubes in operation and to slice the ice cubes in a short period of time. With arrangement of the plural cutting blades about the rotary shaft 30, the cutting mechanism SM can be constructed small in size, and the ice cubes A can be sliced in a shorter period of time. In the case that the chute 41 is inserted into the inlet opening 12 formed in the cylindrical head portion of upper hood 10 to introduce the ice cubes falling from the ice storage container 40 toward the rotary shaft 30, ice cubes in the ice storage container can be prevented from rotation with the rotary shaft 30 to decrease cutting noises in operation.

As the cutting disk 20 and lower hood 40 in the frozen beverage blender are mounted to the lower end outer periphery of upper hood 10 by means of common screws, the cutting blades 23 assembled with the cutting disk 20 and the rotary wing 31 can be removed downwardly in a simple manner for washing.

Although in the embodiment described above, the ice cutting mechanism has been adapted to a frozen beverage blender in which sliced ice pieces are introduced into beverage such as condensed juice stored in the beverage container, the ice cutting mechanism may be adapted in use only to introduce sliced ice pieces into an appropriate container.

What is claimed is:

1. A frozen beverage blender equipped with an ice cutting mechanism including an upright machine frame mounted on a base structure, an upper hood horizontally mounted on the upper portion of the machine frame to be detachable downwardly, the upper hood having a downwardly inclined conical inner surface, a cutting disk coupled at its lower end outer periphery with a lower end outer periphery of the upper hood to be detachable downwardly, the cutting disk having a conical upper surface downwardly inclined from its center and being provided with a cutting blade mounted thereon in such a manner that the edge of the cutting blade is positioned upward at a radial slit formed in the cutting disk, a rotary shaft vertically extending through the center of the upper hood and being supported at its lower end on the head of the cutting disk, and a rotary plate driven by the rotary shaft to rotate along the upper surface of the cutting disk, wherein the upper hood has a cylindrical head portion formed with an inlet opening for introducing ice cubes falling from an ice storage container located above the machine frame, and wherein a cylindrical lower hood is integrally assembled with the lower end outer periphery of the upper hood through the lower end outer periphery of the cutting disk, and a beverage container put on the base structure to store an amount of beverage and detachably engaged at its upper end opening with the lower end outer periphery of the lower hood to receive ice pieces sliced by and dropping from the cutting blade.

2. A frozen beverage blender as set forth in claim 1, wherein the inlet opening is formed in the peripheral wall of the cylindrical head portion of the upper hood, and a chute is inserted into the inlet opening from upward to introduce ice cubes falling from the ice storage container located above the machine frame.

3. A frozen beverage blender as set forth in claim 1, wherein an angle of the conical upper surface of the cutting disk relative to the conical inner surface of the upper hood is determined taking into account of the size of ice cubes stored in the ice storage container.

4. A frozen beverage blender as set forth in claim 1, wherein the cutting disk is formed with a plurality of radial slits extending from its center, and wherein a plurality of cutting blades are mounted on the cutting disk in such a manner that the edges of the cutting blades are positioned upward at the radial slits so that ice pieces sliced by the cutting blades are introduced to drop toward the center of the lower hood.

5. A frozen beverage blender as set forth in claim 1, wherein a rectifier is mounted to the bottom face of the cutting disk to introduce the ice pieces sliced by the cutting blade toward the center of the lower hood.

6. A frozen beverage blender as set forth in claim 1, wherein the cutting disk is provided at its head portion with a support boss of the lower end of the rotary shaft.

7. A frozen beverage blender as set forth in claim 1, wherein an elastic ring is coupled with the lower end outer periphery of the lower hood to be detachably engaged with the upper end opening of the beverage container in a liquid tight manner.

8. A frozen beverage blender as set forth in claim 1, an electric motor is mounted on an upper portion of the machine frame at one side of the upper hood to drive the rotary shaft.

9. A frozen beverage blender as set forth in claim 1, wherein an agitator is detachably mounted to the bottom of the beverage container and driven by a drive shaft provided on the base structure coaxially with the rotary shaft.

10. A frozen beverage blender as set forth in claim 9, wherein an electric motor is mounted on the base structure at one side of the beverage container to drive the drive shaft.

11. An ice cutting mechanism comprising:

an upright machine frame mounted on a base structure;
an upper hood horizontally mounted on the upper portion of the machine frame to be detachable downward, the upper hood having
a downwardly inclined conical inner surface;
a cutting disk coupled at its lower end outer periphery with a lower end outer periphery of the upper hood to be detachable downwardly, the cutting disk having a conical upper surface downwardly inclined from its center and being provided with a cutting blade mounted thereon in such a manner that the edge of the cutting blade is positioned upward at a radial slit formed in the cutting disk;
a rotary shaft vertically extending through the center of the upper hood and being supported at its lower end on the head of the cutting disk; and
a rotary plate driven by the rotary shaft to rotate along the upper surface of the cutting disk;
wherein the upper hood has a cylindrical head portion formed with an inlet opening for introducing ice cubes falling from an ice storage container located above the machine frame.

12. An ice cutting mechanism adapted for use in frozen beverage blender as set forth in claim 11, wherein the inlet opening is formed in the peripheral wall of the cylindrical head portion of the upper hood, and a chute is inserted into the inlet opening from upward to introduce ice cubes falling from the ice storage container located above the machine frame.

* * * * *